United States Patent [19]

Lewis et al.

[11] Patent Number: 5,340,121

[45] Date of Patent: Aug. 23, 1994

[54] FACE SEAL WITH INTEGRAL FLUOROCARBON POLYMER BELLOWS

[75] Inventors: Terry M. Lewis, Lake Forest; John W. Kosty, Fountain Valley; James R. Goodman, Corona; Mark A. Krzemein, Irvine; Jon M. Lenhert, Brea; Jeffrey H. Arbogast, Newport Beach, all of Calif.

[73] Assignee: Furon Company, Laguna Niguel, Calif.

[21] Appl. No.: 961,429

[22] Filed: Oct. 15, 1992

[51] Int. Cl.⁵ .................................. F16J 15/36
[52] U.S. Cl. ................................... 277/43; 277/88
[58] Field of Search .............. 277/42, 43, 85, 88, 277/89, 137, 212 FB

[56] References Cited

U.S. PATENT DOCUMENTS

| | | |
|---|---|---|
| 2,308,114 | 1/1943 | Schjolin .................... 277/42 |
| 2,347,118 | 4/1944 | Matter ...................... 277/42 |
| 2,489,545 | 11/1949 | Storer et al. .............. 277/42 |
| 2,512,749 | 6/1950 | McCloskey ................ 277/89 |
| 2,984,505 | 5/1961 | Andresen et al. .......... 277/42 |
| 3,977,685 | 8/1976 | Greenawalt et al. ....... 277/89 |
| 4,063,741 | 12/1977 | Kerr ..................... 277/40 X |
| 4,275,889 | 6/1981 | Butler et al. ............. 277/42 |
| 4,289,320 | 9/1981 | Atenau ................. 277/88 X |
| 4,415,167 | 11/1983 | Gits ........................ 277/88 |
| 4,776,598 | 10/1988 | Akema .................... 277/88 |
| 4,838,560 | 6/1989 | Heilala .................... 277/42 |
| 4,890,851 | 1/1990 | Avard et al. . |
| 4,923,432 | 5/1990 | Porter ............. 277/212 FB X |
| 4,971,337 | 11/1990 | Hufford . |
| 4,997,192 | 3/1991 | Nagai et al. . |
| 5,072,951 | 12/1991 | Hinks . |
| 5,076,589 | 12/1991 | Marsi . |

FOREIGN PATENT DOCUMENTS

| | | | |
|---|---|---|---|
| 1450663 | 7/1966 | France .................... 277/42 |
| 821714 | 10/1959 | United Kingdom ........ 277/89 |
| 888118 | 1/1962 | United Kingdom ........ 277/42 |
| 912305 | 12/1962 | United Kingdom ........ 277/43 |
| 2065243 | 6/1981 | United Kingdom ........ 277/38 |

Primary Examiner—William A. Cuchlinski, Jr.
Assistant Examiner—Scott W. Cummings
Attorney, Agent, or Firm—Christie, Parker & Hale

[57] ABSTRACT

A mechanical seal assembly is provided for inhibiting a fluid located in a higher pressure region of an apparatus from flowing to a relatively lower pressure region. The seal assembly is configured for cooperation with a seal ring connected to a cylindrical shaft which rotates about its longitudinal axis and which is mounted in the apparatus housing. The seal assembly includes an outer casing in which is mounted a non-rotatable seal ring which encircles the shaft for limited axial movement toward and away from the shaft seal ring. A biasing element is mounted in the outer casing for urging the non-rotatable seal ring axially into slidably mating engagement with the sealing face of the rotatable shaft seal ring. The biasing element includes a cylindrical bellows which encircles the shaft and a spring. The bellows includes a collapsible outer wall with a first skirt on one end of the outer wall and a second skirt on the other end of the outer wall. The first skirt is bonded to the seal ring, and the second skirt is clamped axially against the outer casing end wall.

23 Claims, 5 Drawing Sheets

FACE SEAL WITH INTEGRAL FLUOROCARBON POLYMER BELLOWS

FIELD OF THE INVENTION

This invention relates to a mechanical seal assembly of improved design.

BACKGROUND OF THE INVENTION

Mechanical seal assemblies are used to prevent fluids (liquids or gases) from leaking along a rotatable shaft from a relatively higher pressure region in an apparatus in which the shaft is mounted to a relatively lower pressure region. Such seal assemblies typically incorporate a non-rotatable seal ring which interacts with a rotatable seal ring connected around the shaft. Both the rotatable and non-rotatable seal rings are provided with sealing faces which oppose one another in sliding, mating relationship as they rotate relative to one another. Generally, the shaft seal ring is constructed of a relatively hard, non-weldable-type material, such as silicon carbide, tungsten carbide, or Stellite ®, so as to withstand operating conditions and provide a desirable seal life. The non-rotatable seal ring is commonly made of a softer material such as carbon, but can be a polymeric material, or ceramic, or the like.

Components which interact together, such as springs and/or bellows, and the like, are employed to urge the seal faces into contact with one another to provide the seal. A small portion of the fluid being sealed off creates a fluid film between the seal faces for cooling and lubricating them as they rotate relative to one another, thereby prolonging the operating life of the seals. In many instances, the clearance between the inner diameter of the non-rotatable seal ring and the shaft is small. In such cases, the fluid which seeps between the seal faces becomes trapped between the carbon ring and the rotating shaft. When relatively high temperatures are present, it is possible that the fluid may undergo thermal degradation, for example, producing coke when the fluid is oil, thereby generating highly abrasive particles. Such particles can damage the seal components, thereby reducing the effective life of the seal.

In many instances, mechanical seal assemblies are used in environments in which the seals are subjected to large temperature excursions. For example, when a mechanical seal is used in equipment which operates at high temperatures, e.g., up to 500° F., or hotter, the seal components heat up to these high temperatures as the equipment heats up. Commonly, one or more elastomeric O-rings are incorporated into a mechanical seal assembly to inhibit the flow of fluids between the mechanical seal assembly and the supporting structure of the apparatus. Because the various components of the mechanical seal and the support structure in which it is located are commonly constructed of different materials which have different thermal coefficients of expansion, as the seal heats up, the different seal components and the support structure expand at different rates and in different amounts.

In prior-art mechanical seal designs, typically such secondary seals are in direct contact with mechanical seal components which are moveable for positioning the non-rotatable seal ring. In such prior-art seals, where the secondary O-ring seal is required to move relative to the positioning components of the mechanical seal as the components expand during heat up, the use of such secondary seals can cause the mechanical seal to fail. Such failure results from the elastomeric O-ring's tendency to stick or bind to the seal component or components which it contacts. Deterioration of the O-ring from chemical attack and from exposure to high temperatures exacerbates the sticking and binding problem. Such binding can inhibit the movement of the seal components as they expand relative to each other and relative to the support structure. Inhibiting the movement of the seal components can result in the seal faces unseating, causing the seal to fail.

In addition to the problems associated with the sticking of elastomeric O-rings during heat up, such O-rings deteriorate at such high temperatures and, thus, have a limited expected useful life in a high-temperature environment. Furthermore, in many applications, the secondary seals are subject to exposure to various fluids (liquids or gases) which tend to attack the elastomer, causing it to deteriorate.

It is therefore desirable to provide to the art a mechanical seal that is of a design that does not incorporate an elastomeric O-ring seal that is required to move with the mechanical seal components as the seal is heated to operating temperature. The improved mechanical seal will have an enhanced reliability and longer useful life than prior-art seals.

SUMMARY OF THE INVENTION

A mechanical seal assembly which does not incorporate secondary O-ring seals which must move as components of the assembly expand or contract during heating or cooling is provided. The seal assembly is configured for cooperation with the radially extending annular sealing face of a seal ring which is connected to a cylindrical shaft which rotates about its longitudinal axis and which is mounted in the apparatus housing. In operation, the seal inhibits a fluid located in a higher pressure region of the apparatus from flowing to a relatively lower pressure region.

The seal assembly includes an outer casing which has sides and an end wall with an opening through the center of the end wall through which the shaft extends. A non-rotatable seal ring is mounted in the outer casing and encircles the shaft for limited axial movement toward and away from the shaft seal ring. A radially extending annular sealing face is on the end of the non-rotatable seal ring distal the housing end wall for slidably mating with the opposing shaft seal ring sealing face. A radially extending annular face is on the end of the non-rotatable seal ring, proximal the housing end wall.

Means are mounted in the outer casing for urging the non-rotatable seal ring axially into slidably mating engagement of its radially extending annular sealing face with the radially extending annular sealing face of the rotatable shaft seal ring. In a preferred embodiment of the present invention, the urging means comprises a cylindrical annular or open bellows and a spring. The cylindrical bellows encircles the shaft and is aligned with its longitudinal axis coincident with the longitudinal axis of the shaft. The bellows comprises an annular collapsible outer wall with a first end of the outer wall proximal the non-rotatable seal ring and the second end of the outer wall distal the non-rotatable seal ring. A first skirt is integrally connected to and extends radially around the periphery of the first end of the collapsible outer wall in a direction toward the longitudinal axis of the shaft. A second skirt is integrally connected to and extends radially around the periphery of the second end of the collapsible outer wall in a direction away from the longitudinal axis of the shaft. The second skirt has a radially extending annular front surface facing toward the non-rotatable seal ring and a radially extending annular rear surface facing away from the non-rotatable seal ring. The first bellows skirt is bonded to the radially extending annular face of the non-rotatable seal ring. The second bellows skirt is clamped axially against the outer casing end wall. In one embodiment, the second bellows skirt is bonded to the outer casing wall.

The secondary seals incorporated into the mechanical seal assembly of the present invention are the bond between the first bellows skirt and the seal ring and the press fit between the second bellows skirt and the outer casing end wall.

In a preferred embodiment, the spring is in the form of a ring with an opening through its center through which the shaft extends. The spring is housed within the bellows and extends between the casing end wall and the inside surface of the first bellows skirt.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION

Figure 1:
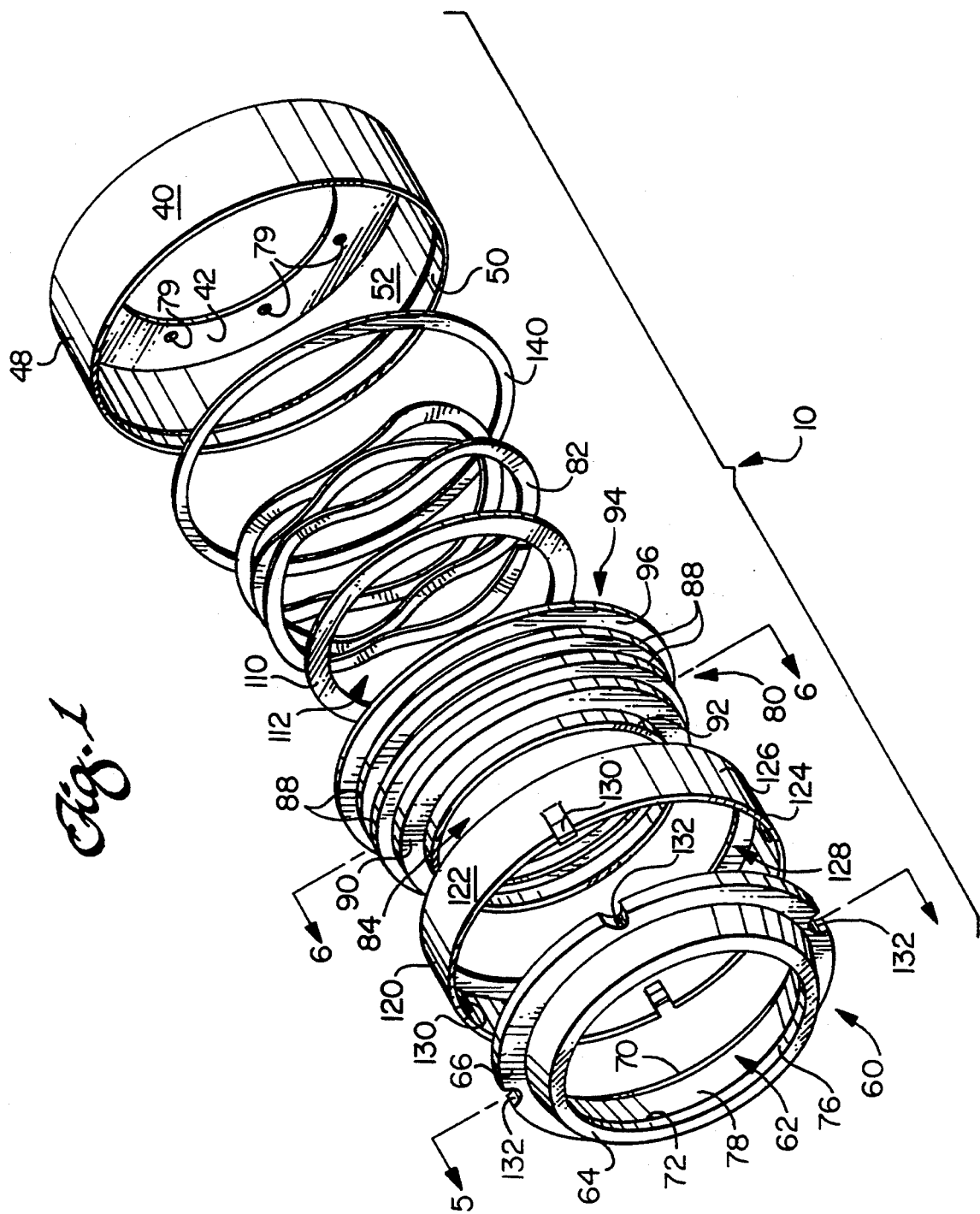
FIG. 1 is a semi-schematic perspective exploded view of one embodiment of a mechanical seal assembly provided in accordance with practice of the present invention for inhibiting a fluid located in a relatively higher pressure region of an apparatus from flowing to a relatively lower pressure region.
Figure 2:
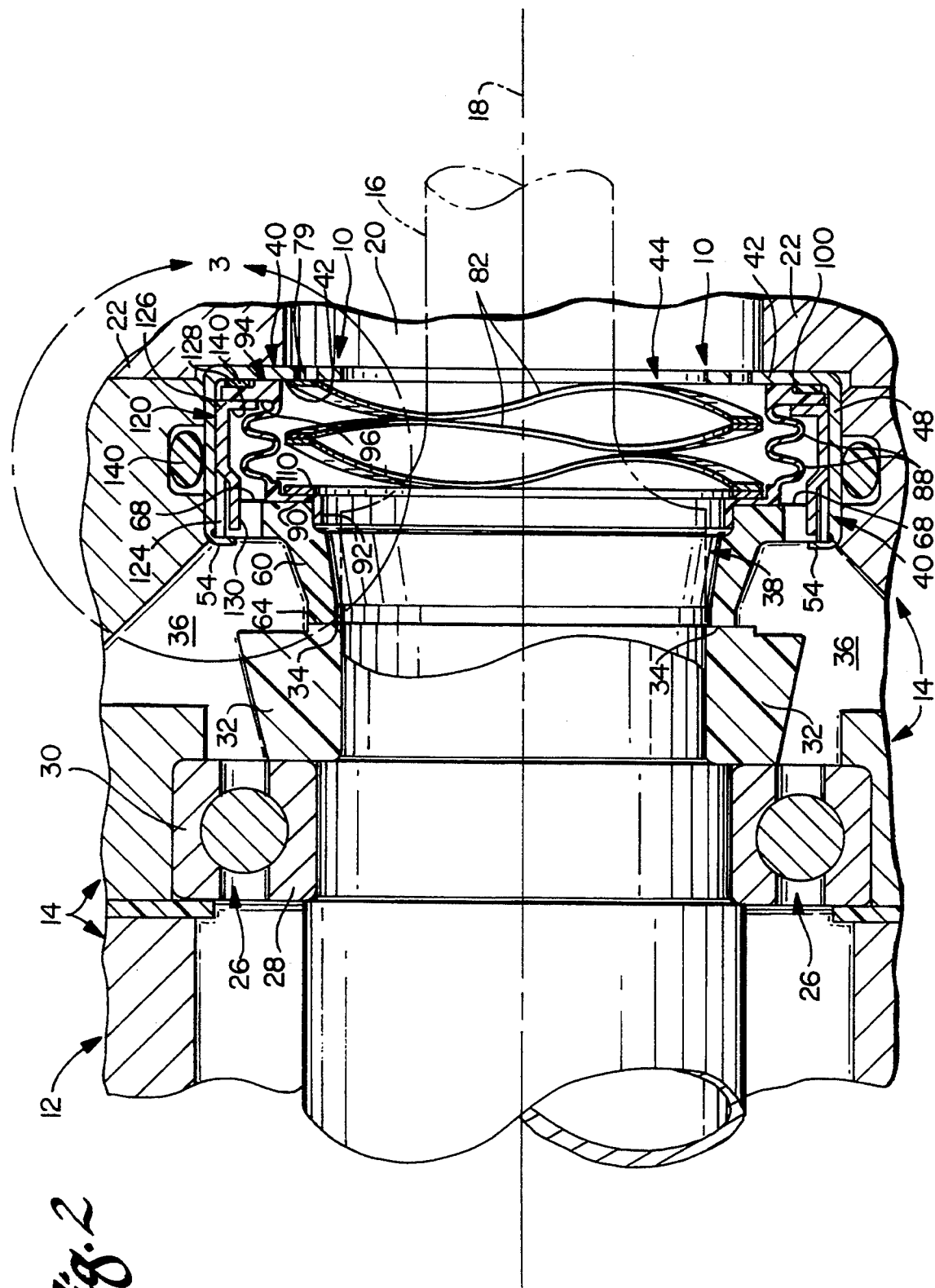
FIG. 2 is a semi-schematic cross-sectional side view of the mechanical seal shown in FIG. 1 installed in the apparatus.

Referring to FIGS. 1 and 2, there is shown a preferred embodiment of a mechanical seal assembly 10 provided in accordance with practice of the present invention. Referring particularly to FIG. 2, the mechanical seal assembly 10 is mounted in an apparatus 12 which includes a stationary housing 14. A shaft 16, which rotates about its longitudinal axis 18, is mounted in the housing and extends through an opening 20 in the housing wall 22. (The shaft 16 is shown partially in phantom for clarity of illustration of the seal assembly components.) In the illustrated embodiment, the shaft 16 rides in a roller bearing 26, which includes an inner bearing race 28 fixedly mounted onto the shaft 16 for rotation with the shaft, and an outer race 30 fixedly mounted to the housing 14.

An annular seal ring 32 is fixedly mounted onto the shaft for rotation with the shaft. The mounting of the inner and outer bearing races and the seal ring can be done by common mounting methods, such as, by bonding, by press fitting, or by pinning, or the like. As will be described in greater detail below, the seal ring 32 incorporates a radially extending annular sealing face 34 which cooperates with the mechanical seal assembly 10 to inhibit a fluid in a relatively higher pressure region 36 of the apparatus from flowing to a relatively lower pressure region 38, i.e., the region along the shaft, and, in the illustrated embodiment, out through the opening 20 in the housing wall.

Mechanical seal assemblies provided in accordance with practice of the present invention can be used in any apparatus which incorporates a shaft and in which it is desired to inhibit flow of fluids along the shaft from a high-pressure region to a low-pressure region. Such devices can include pumps, starter motors, and other like equipment. The seal 10 of the present invention is particularly useful in apparatuses which are subject to large temperature excursions, e.g., equipment that runs at temperatures of up to 500° F., or hotter, and which are associated with corrosive fluids.

The positioning and orientation of the components of the mechanical seal assembly relative to each other is described below as they are shown in FIG. 2.

Figure 3:
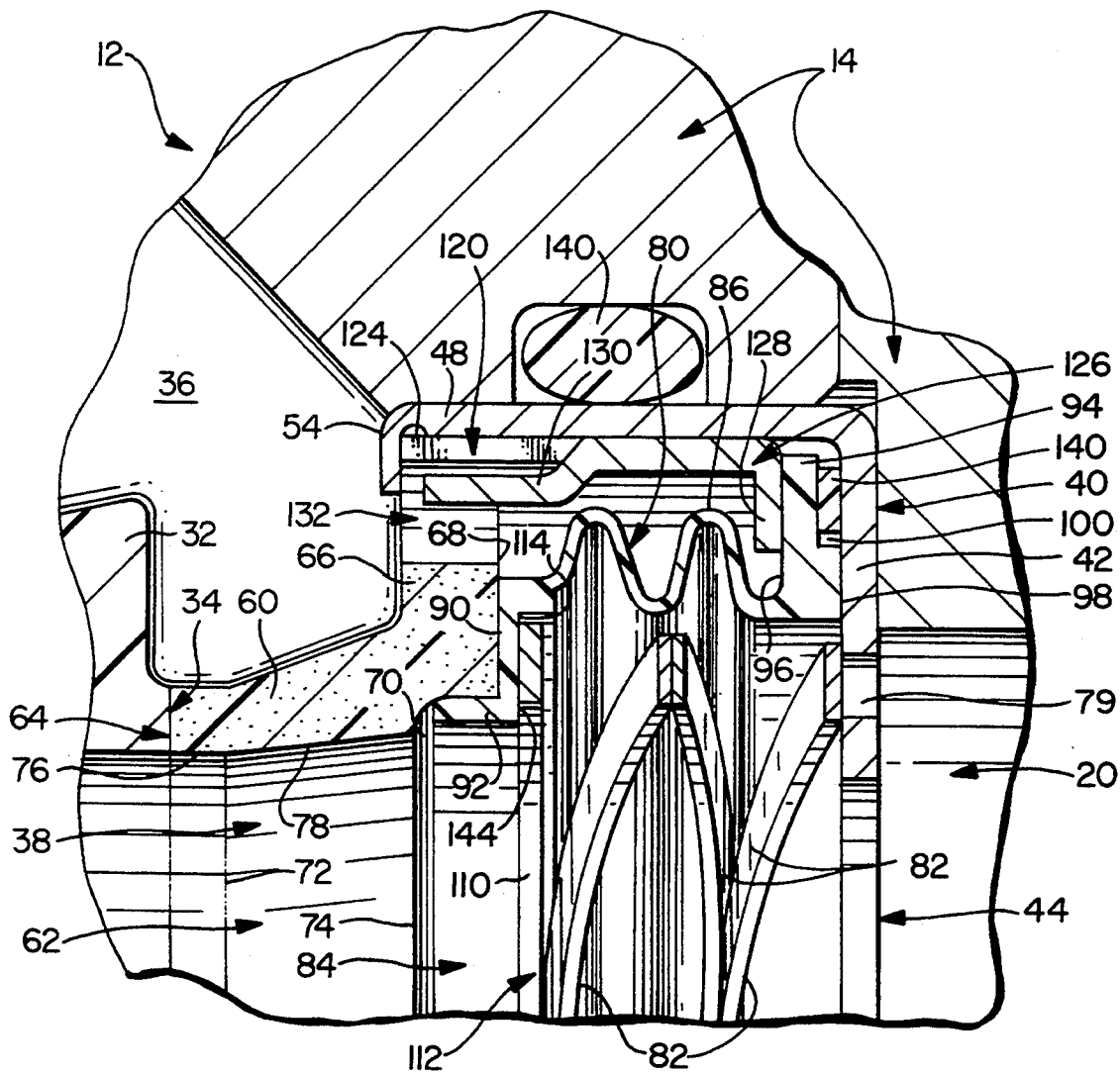
FIG. 3 is an enlarged view of that portion of FIG. 2 which is within the circle 3—3.

Turning to FIGS. 1 and 2, and, in addition, to FIG. 3, the seal assembly 10 comprises a cylindrical outer casing 40 having a radially extending circular end wall 42 with a circular opening 44 through its center through which the shaft 16 extends. An axially extending cylindrical skirt 48 is integrally connected around the circumference of the end wall 42. In a preferred embodiment, the casing components, i.e., the end wall 42 and the cylindrical skirt 48, are formed from 304 stainless steel. Other appropriate materials can be used if desired.

The cylindrical skirt 48 extends axially away from the end wall 42 in the direction of the shaft seal ring 32. As is best seen in FIG. 1, a groove 50 is around the portion of the inside surface 52 of the skirt 48 distal the end wall 42. When the seal is assembled, as is shown in FIGS. 2 and 3, the portion of the skirt incorporating the groove 52 is crimped over to thereby provide a radially extending annular flange 54 around the periphery of the skirt 48. The flange 54 extends in the direction of the longitudinal axis 18 of the shaft.

A non-rotatable seal ring 60 is flexibly mounted for limited axial movement in the outer casing 40. In a preferred embodiment, the seal ring 60 is formed of carbon and has a circular opening 62 through its center through which the shaft 16 extends. A radially extending annular sealing face 64 is provided on the end of the non-rotatable seal ring 60 distal the outer casing end wall 42. The annular sealing face 64 is provided for slidably mating with the opposing annular sealing face 34 of the shaft seal ring 32. If desired, the seal ring 60 can be fabricated of appropriate materials other than carbon, e.g., a ceramic or polymer material, or the like. The shaft seal ring 32 can be made of metals such as Stellite ®, or can be of ceramic or polymeric materials. In one embodiment, the seal ring 32 is fabricated of M50 tool steel. The selection of seal ring materials depends upon such factors as the environment in which the seal is to be used, i.e., the nature of the fluids which will be in contact with the seals and the temperatures to which the seals will be exposed.

Figure 5:
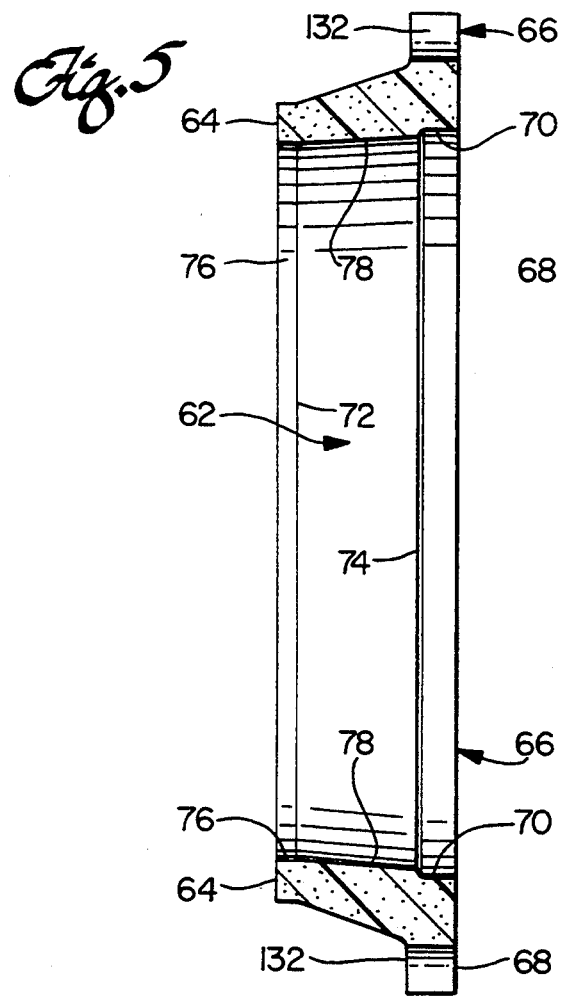
FIG. 5 is a cross-sectional view taken on line 5—5 of FIG. 1.

Turning to FIG. 5, in addition to FIGS. 1-3, a radially extending annular flange 66 is on the end of the non-rotatable seal ring 60 proximal the outer casing end wall. The flange 66 has a flat surface 68 which faces the casing wall 42. An annular recess 70 is around the inside diameter of the annular face 68. In an exemplary embodiment, the diameter of the center opening 62 remains constant from a location at the sealing face 64 to a location 72 a first axial distance toward the annular recess 70. The diameter of the center opening 62 progressively increases from the first axial location 72 to a location 74 at the annular recess. This provides a flat radial surface 76 extending around the opening of the seal ring 60 adjacent the shaft seal ring 30 and a tapered or chamfered surface 78 extending from the flat surface to the annular recess. In other embodiments of the present invention, the diameter is stepped from a first diameter at a location at the sealing face 62 to the location 72, to a second diameter which is larger than the first diameter and which remains constant from the location 72 to the location 74 at the annular recess. More than one such step may be provided, if desired.

The provision of the diameter of the center opening 62 which progressively increases or is increased in one or more steps as described above is a key feature of the mechanical seal provided in accordance with practice of the present invention. Having the chamfered surface extending from the flat surface is particularly important when the clearance between the inner diameter of the seal ring, i.e., the flat surface of the seal ring, and the shaft is small. While the provision of the chamfered surface is important, it is preferred that the chamfer not start immediately at the face 64 but at a point away from the face, as is shown, so that the flat radial surface 76 is present. This reduces the tendency of the carbon face to chip and allows the contact area of the sealing face to remain constant as the seal wears axially. With a sealing ring of the illustrated configuration, but with the chamfer starting at the face 64, as the seal wore axially, the sealing face area would become progressively smaller. This would decrease the seal's capability as time progressed.

In sealing arrangements where the diameter of the center opening is constant, fluid which seeps between the seal faces can become trapped between the carbon ring and the rotating shaft. When relatively high temperatures are present, it is possible for the fluid to undergo thermal degradation, for example, producing coke when the fluid is oil, thereby generating abrasive particles which damage the seal. Because the chamfered surface 78 of the preferred embodiment of the present invention opens away from the shaft, fluid which flows or seeps between the seal faces is forced past the flat radial surface 76 and into the area between the chamfered surface 78 and the shaft. This reduces the time that the fluid is trapped between closely rotating surfaces, thereby minimizing thermal degradation and possible build up of abrasive particles. In a preferred embodiment, a plurality of holes 79 are through the end wall 42 around its perimeter to allow for the escape of fluids which may seep past the sealing faces and along the chamfered surface.

Means are mounted in the outer casing 40 for urging the non-rotatable seal ring 60 axially for sliding, mating engagement of its radially extending annular sealing face 64 with the radially extending annular sealing face 32 of the rotatable shaft seal ring 30. The urging means comprises a cylindrical annular bellows 80 (shown separately in cross-section in FIG. 6) and an annular spring 82.

Figure 6:
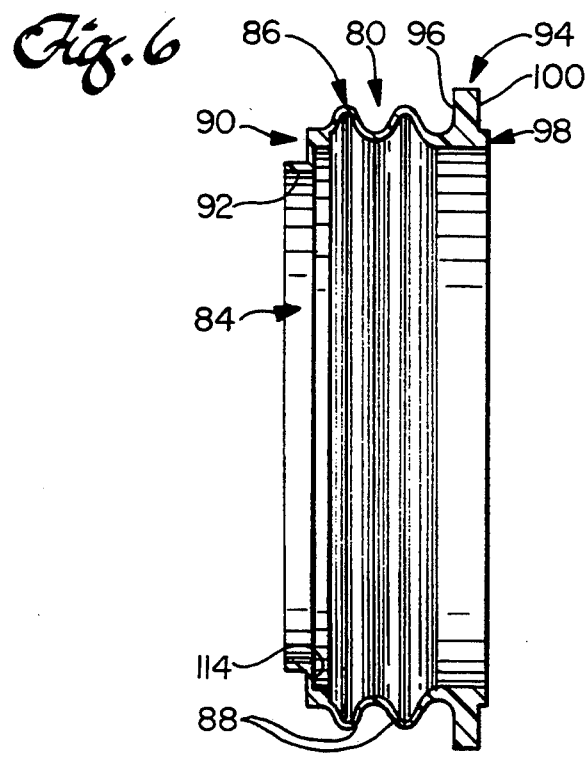
FIG. 6 is a cross-sectional view taken on line 6—6 of FIG. 1.

In a preferred embodiment, the bellows 80 is constructed of a fluorocarbon polymer and is formed by machining. If desired, the bellows can be molded. A preferred fluorocarbon polymer is provided by DuPont Company of Wilmington, Del., under the trademark Teflon ®. The bellows has an opening 84 through its center through which the shaft 16 extends. The longitudinal axis of the bellows opening 84 is coincident with the longitudinal axis 18 of the shaft 16. In the illustrated embodiment, the bellows 80 incorporates an annular collapsible wall 86 with a first end of the wall proximal the non-rotatable seal ring and the second end of the wall distal the non-rotatable seal ring. In a preferred embodiment, the cross-section of the bellows wall, as is best seen in FIGS. 2, 3 and 6, is in the form of a wave. Although the wall is shown with two waves or convolutions 88, more or fewer convolutions can be provided as desired, depending on the size of the bellows.

A first skirt 90, comprising a fluorocarbon polymer, is integrally formed with and extends radially around the periphery of the first end of the collapsible outer wall. The skirt 90 extends or projects in a direction toward the shaft's longitudinal axis 18. A flange 92 is integrally formed with the skirt 90 and extends around the inner circumference of the skirt in a direction away from the outer casing circular end wall 42.

A second skirt 94 comprising a fluorocarbon polymer is integrally formed with and extends radially around the second end of the collapsible outer wall. The second skirt 94 extends in a direction away from the shaft's longitudinal axis 18. The second skirt 94 has a radially extending annular front surface 96, which faces toward the non-rotatable seal ring 30, and a radially extending annular rear surface 98, which faces away from the non-rotatable seal ring. As is best seen in FIGS. 2, 3 and 6, in a preferred embodiment, an annular groove 100 is around the outer periphery of the second skirt rear-facing surface 98.

The first bellows skirt 90 is bonded to the radially extending annular face 68 of the non-rotatable seal ring 60, with the first skirt flange 92 located in and bonded to the non-rotatable seal ring annular recess 70. In a preferred embodiment, a ring or washer 110, which has an opening 112 through its center and which encircles the shaft 16, is mounted on the surface 114 of the skirt 90 (best seen in FIGS. 3 and 6) which faces away from the seal ring 30. In one embodiment, the ring 110 is fabricated of 304 stainless steel. Other appropriate metals of appropriate grades could be used, if desired.

In an exemplary embodiment, the Teflon ® bellows skirt 90 is bonded to the annular face 68 of the non-rotatable carbon seal ring using a perfluoroalkoxy resin film (PFA film). If desired, the bonding agent can be fluorinated ethylene-propylene resin (FEP) film or other appropriate bonding material. To effect the bonding, a film of PFA of an appropriate thickness, for example, in a preferred embodiment, a 0.010-inch thick film, is placed on the bellows side of the carbon seal ring 60 against the annular face 68 and in the groove 70. The bellows skirt 90 and flange 92 are then placed against the PFA film. The bellows and seal assembly, with the PFA film in place as described above, is engaged and clamped axially between a welding pedestal and a heat transfer fixture. The carbon/PFA/Teflon ® interface is heated to approximately 700° F. and maintained at this temperature for approximately one hour. The bellows and carbon seal assembly incorporating the PFA bond between the skirt 90 and carbon face 68 is then cooled and removed from the bonding fixture. In an alternative embodiment, PFA or FEP powder or other bonding agent is blended with the Teflon ® resin used to manufacture the bellows, and the bellows skirt is bonded to the annular face of the seal by mating the bellows skirt with the seal face and heating the surfaces to 700° F. In this embodiment, no PFA or FEP film is required.

It is an important feature of the present embodiment of the seal assembly of the present invention that the bellows skirt 90 incorporate a flange, such as the flange 92, which is configured to mate with the seal ring recess 70. This arrangement is important during the bonding process because Teflon ® and carbon have very different thermal expansion properties. For example, Teflon ® expands approximately twice as much as carbon when heated. When the bellows unit and carbon seal ring have been assembled for bonding and are subjected to the bonding temperature, the Teflon ® bellows tends to expand approximately twice as much as the carbon seal. If the bellows flange 92 were not in the recess 70, the position of the surface of the bellows on the face 68 of the carbon seal would change during the bonding process. During the cool-down phase, and as the bonding agent solidified, the skirt would not return to the same position on the seal face 68 where it was at the start of the bonding process because it would be held up by the bonding agent as the bond was formed. This would result in stresses being introduced into the bellows material and carbon seal, which could reduce the seal's useful life.

The spring 82 encircles the shaft 16 and is mounted inside the bellows. In an exemplary embodiment, the spring is a "wave spring" fabricated of 17-7 stainless steel. Other types of springs can be used, if desired. The spring is compressed between the outer casing end wall 42 and the ring 110. When no ring 110 is provided, the spring is compressed between the outer casing wall 42 and the bellows skirt surface 114. The spring and bellows arrangement biases the non-rotatable seal ring 60 axially for mating engagement of its radially extending annular sealing face 64 with the radially extending sealing face 32 of the shaft seal ring 30. The ring 110 acts to distribute the force of the spring evenly around the circumference of the bellows, thereby applying an equal force around the periphery of the sealing face 64.

A cylindrical inner casing 120 is mounted within the outer casing 40. In an exemplary embodiment, the inner casing 120 is made of 304 stainless steel and incorporates an axially extending cylindrical outer wall 122 with a first end 124 being proximal the non-rotatable seal ring and a second end 126 distal the non-rotatable seal ring. A flange 128, which extends radially toward the longitudinal axis of the shaft, is on the second end 126 of the inner casing 120.

In an exemplary embodiment, a plurality of lanced tabs 130, in the illustrated embodiment four such tabs 130, are formed in the cylindrical wall 122 of the inner casing. The lanced tabs 130 are spaced equidistantly apart around the cylindrical wall of the casing for mating with a corresponding number of axially extending grooves 132 which are formed in the outer perimeter of the non-rotatable seal ring flange 66. Upon assembly of the mechanical seal assembly, the lanced tabs mate with the grooves 132 to hold the seal ring 60 from rotational movement within the outer casing. In other embodiments, it is contemplated that the lanced tabs and seal ring grooves can be eliminated, and that rotational movement of the seal ring 60 will be prevented by the torsional resistance of the bellows to which the ring is bonded.

The second radially extending bellows skirt 94 is clamped axially between the inner casing flange 128 and the outer casing end wall 42, with the end 124 of the casing wall 122 pressed against the outer casing flange 54. Preferably, an elastomeric ring 140 is mounted in the groove 100 in the second bellows skirt and extends between the bellows skirt and the outer casing end wall 42. The elastomeric ring compensates for thinning of the perfluorocarbon bellows skirt 94 due to compression and repeated temperature cycling. As is stated above, if desired, the skirt 94 can be bonded to the inner surface of the wall 42. Best seen in FIGS. 2 and 3, in an exemplary embodiment, an O-ring seal 141 is around the outer surface of the casing 40 to inhibit fluids from escaping from the high pressure area 36 between the casing outer surface and the housing. If desired, the O-ring seal can be eliminated and replaced by a press fit between the outer surface of the casing and the housing to prevent fluid escape.

The secondary seals incorporated in the mechanical seal assembly 10 of the present invention are the bond between the bellows skirt 90 and the annular face 68 of the seal ring 60 and the press fit between the bellows skirt 94 and the casing wall 42. When the skirt 94 is bonded to the inner surface of the wall 42, this bond is also considered a secondary seal. In any event, there are no moveable elastomeric O-ring secondary seals incorporated in the mechanical seal 10 of the present invention which contact any moveable components of the seal assembly. The design of the present invention eliminates the problem encountered in prior-art seals where secondary O-ring seals would stick or bind during temperature changes, inhibiting the movement of the seal components which, in turn, resulted in unseating of the sealing surfaces.

Figure 4:
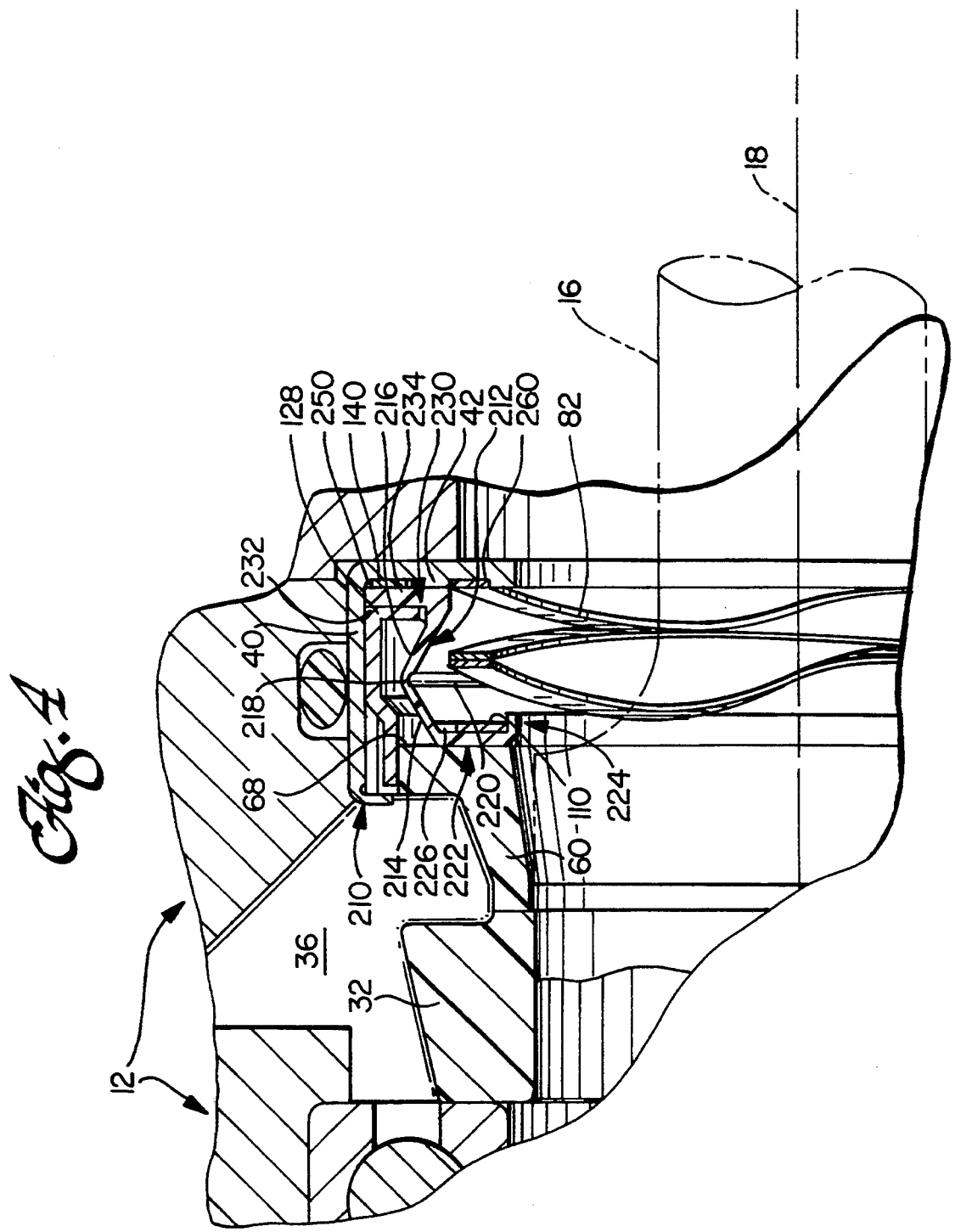
FIG. 4 is a semi-schematic cross-sectional side view of a second embodiment of a mechanical seal provided in accordance with practice of the present invention installed in the apparatus.

Turning to FIG. 4, there is shown another preferred embodiment of a mechanical seal assembly 210 provided in accordance with practice of the present invention. For clarity of illustration, the mechanical seal assembly 210 is shown associated with the same apparatus 12 in which the mechanical seal 10 of the first embodiment of FIGS. 1-3, 5 and 6 is shown. The mechanical seal described in FIG. 4 incorporates many components which are the same as the components of the seal assembly 10; namely, the outer casing 40, the non-rotatable seal ring 60, the annular spring 82, the ring 110 and the elastomeric ring 140. The bellows incorporated into the seal assembly 210 is different from the design of the bellows 80 of the first embodiment of the seal assembly 10. The same reference numerals are used to describe the components of the seal assembly 210 which were used to describe the identical components of the seal assembly 10.

The bellows 212 of the present embodiment is fabricated of a fluorocarbon polymer, such as Teflon ®, encircles the shaft 16 and is aligned with its longitudinal axis coincident with the longitudinal axis 18 of the shaft. The bellows comprises an annular collapsible outer wall which comprises first and second annular segments 214 and 216 joined together along a common edge 218. The outer edge of the first annular segment 214 is the periphery of the first end of the bellows outer wall and the outer edge of the second annular segment is the periphery of the second end of the bellows outer wall. The common edge junction of the first and second annular segments defines a groove 220 around the inside surface of the bellows. A first skirt 222, of a fluorocarbon polymer is integrally formed with and extends radially around the periphery of the collapsible outer wall first end in a direction toward the shaft's longitudinal axis. A flange 224 is around the periphery of the first skirt and extends axially away from the non-rotatable seal ring 60. The first skirt and flange form a groove 226 in which the ring 110 is mounted.

A second skirt 230, of a perfluorocarbon polymer, e.g., Teflon ®, is integrally formed with and extends radially around the periphery of the collapsible outer wall second end in a direction away from the shaft's longitudinal axis 18. The second skirt 230 has a radially extending annular front surface 232 facing toward the non-rotatable seal ring 60 and a radially extending annular rear surface 234 facing away from the non-rotatable seal ring.

The first bellows skirt 222 is bonded to the radially extending annular face 68 of the non-rotatable seal ring 60. The second radially extending bellows skirt 230 is clamped axially between the inner casing flange 128 and the outer casing end wall 42. In an exemplary embodiment of practice of the present invention, a groove 250 is formed around the outer circumference of the outer end wall 42, and the elastomeric ring 140 is mounted in the groove. As was the case for the previous embodiment, the elastomeric ring compensates for thinning of the perfluorocarbon skirt due to compression. In an exemplary embodiment, the rear surface 234 of the skirt is bonded to the outer casing wall 42.

The secondary seals provided in the mechanical seal assembly 210 of the present invention are the bond between the bellows skirt 222 and the annular face 68 of the seal ring 60 and the bond between the bellows skirt 230 and the casing wall 42. When no bond is between the skirt 230 and the casing wall 42, the press fit between the bellows skirt and casing wall acts as a secondary seal. As was the case with the previously described embodiment, there are no moveable elastomeric O-ring secondary seals incorporated in the mechanical seal 210 which contact any moveable components of the seal assembly. Thus, the design of the seal 210 eliminates the problem encountered in prior-art seals where secondary O-ring seals would stick or bond during temperature changes, inhibiting the movement of the seal components, which, in turn, resulted in unseating of sealing surfaces.

In a preferred embodiment, the outer casing end wall 42 has an annular groove 260 in its surface in which the spring 82 rides. The groove 260 aids in maintaining the spring in proper alignment so that equal forces are exerted on the sealing face 64 of the sealing ring 60.

In preferred embodiments of the seal assembly of the present invention, the bellows is designed to apply no axial force at "mean deflection." For example, when the mechanical seal assembly is not mounted in the apparatus, the face 64 of the non-rotatable seal ring 60 will be biased by the spring and bellows to a given distance from the casing end wall 42. This is called the "no-load" condition. When the mechanical seal assembly is first mounted in the apparatus, the non-rotatable seal ring 60 is pushed by the shaft seal ring 32 toward the end wall 42 against the bias of the spring 82. In this condition, the seal ring face 64 is nearer the end wall 42 than when the assembly is under the no-load condition. This is called the "mean deflection" condition. In accordance with practice of the present invention, it is preferred that the bellows exerts no axial force on the seal ring 60 when the ring is at the mean deflection position. Thus, the entire axial force on the seal ring 60 at mean deflection is applied by the spring. By eliminating the effect of the bellows on biasing the seal ring at mean deflection, the forces on the sealing faces, i.e., the force exerted by the spring, can be accurately determined.

The above descriptions of preferred embodiments of the mechanical seal assembly of the present invention are for illustrative purposes. Because of variations which will be apparent to those skilled in the art, the present invention is not intended to be limited to the particular embodiments described above. The scope of the invention is defined in the following claims.

What is claimed is:

1. A mechanical seal assembly for inhibiting a fluid located in a relatively higher pressure region from flowing to a relatively lower pressure region, the seal assembly configured for cooperation with a radially extending annular sealing face of a seal ring which is mounted on a rotatable cylindrical shaft for rotation with the shaft, the seal assembly comprising:

(a) an outer casing having sides and an end wall with an opening through the center of its end wall through which the rotatable cylindrical shaft extends;

(b) a non-rotatable seal ring mounted in the outer casing and encircling the shaft for limited axial movement toward and away from the shaft seal ring, the non-rotatable seal ring having:

(i) on its end distal the casing end wall, a radially extending annular sealing face for mating with the opposing annular sealing face of the shaft seal ring; and (ii) on its end proximal the casing end wall, a radially extending annular face;

(c) means mounted in the outer casing for urging the non-rotatable seal ring axially for mating engagement of its radially extending annular sealing face with the radially extending annular sealing face of the rotatable shaft seal ring, said urging means comprising:

(i) a cylindrical bellows encircling the shaft and aligned with its longitudinal axis coincident with the longitudinal axis of the shaft, the bellows comprising:

an annular collapsible outer wall with a first end of the outer wall proximal the non-rotatable seal ring and a second end of the outer wall distal the non-rotatable seal ring;

a first skirt is connected to and extends radially around the periphery of the first end of the collapsible outer wall in a direction toward the shaft centerline; and a second skirt is connected to and extends radially around the periphery of the second end of the collapsible outer wall in a direction away from the shaft centerline, the second skirt having a radially extending annular front surface facing toward the non-rotatable seal ring and a radially extending annular rear surface facing away from the non-rotatable seal ring;

wherein the annular face on the end of the non-rotatable seal ring proximal the outer casing end wall has an annular recess around the center opening, and wherein a flange extends around the inner circumference of the first bellows skirt in a direction away from the outer casing end wall, a bond being between the first bellows skirt and the radially extending annular face of the non-rotatable seal ring with the first skirt flange located in the non-rotatable seal ring annular recess, and wherein the second bellows skirt is clamped axially against the outer casing end wall; and (ii) an annular spring encircling the shaft and extending between the end wall of the outer casing and the first bellows skirt for biasing the non-rotatable seal ring axially for mating engagement of its radially extending annular sealing face with the radially extending annular sealing face of the rotatable shaft seal ring.

2. A mechanical seal assembly as is claimed in claim 1, wherein the bellows comprises a fluorocarbon polymer, and wherein the skirts are integrally formed with the bellows.

3. A mechanical seal assembly as is claimed in claim 1, wherein the first skirt flange is bonded to the surface of the seal ring in the annular recess.

4. A mechanical seal assembly as is claimed in claim 1, wherein a ring which encircles the shaft is mounted against a surface of said first bellows skirt which faces away from the seal ring, and wherein the annular spring encircles the shaft and extends between the end wall of the outer casing and the ring.

5. A mechanical seal assembly as is claimed in claim 1, additionally comprising an inner casing encircling the shaft, the inner casing having an axially extending cylindrical wall with a first end of said wall proximal the non-rotatable seal ring and a second end of said wall distal the non-rotatable seal ring, wherein a flange, which extends radially toward the shaft center line, is on the distal end of the wall, the second bellows skirt being clamped axially in the outer casing between the inner casing flange and the outer casing end wall.

6. A mechanical seal assembly as is claimed in claim 5, wherein a plurality of lanced tabs are in the axially extending cylindrical wall of the inner casing, the tabs mating with a plurality of axially extending grooves in the outer perimeter of the non-rotatable seal ring to thereby hold the non-rotatable seal ring from rotational movement within the casings.

7. A mechanical seal assembly as is claimed in claim 6, wherein the second bellows skirt comprises an annular groove around the outer periphery thereof and the skirt is clamped axially in the outer casing between the cylindrical inner casing flange and an annular elastomeric ring mounted in the second bellows skirt groove.

8. A mechanical seal assembly as is claimed in claim 7, wherein the second bellows skirt is bonded to the outer casing end wall.

9. A mechanical seal assembly as is claimed in claim 1, wherein the diameter of the center opening of the non-rotatable seal ring remains constant from a location at the annular sealing face to a location a first axial distance away from the annular sealing face, the diameter progressively increasing from the first axial location in a direction away from said annular sealing face.

10. A mechanical seal assembly as is claimed in claim 1, wherein the bellows outer wall, in cross-section, is in wave form.

11. A mechanical seal assembly as is claimed in claim 1, wherein the bellows exerts no axial force on the seal ring when the seal ring is at a mean deflection position.

12. A mechanical seal assembly as is claimed in claim 1, wherein the bellows outer wall comprises first and second annular segments joined together along a common edge, an end of the first annular segment distal from the common edge defining a first peripheral end of the bellows outer wall which is connected to the first skirt, an end of the second annular segment distal from the common edge defining a second peripheral end of the bellows outer wall which is connected to the second skirt.

13. A mechanical seal assembly as is claimed in claim 12, wherein the common edge junction of the first and second annular segments defines a groove around the inside surface of the bellows.

14. A mechanical seal assembly as is claimed in claim 1, wherein a groove is around the outer circumference of the outer casing wall and an elastomeric ring is mounted in the groove, the elastomeric ring being between the casing wall and the second bellows skirt.

15. A mechanical seal assembly as is claimed in claim 1, wherein the outer casing end wall has an annular groove in its surface in which the annular spring rides.

16. A mechanical seal assembly as is claimed in claim 1, wherein the outer casing comprises a plurality of holes for escape of fluids which seep between the sealing faces and into the assembly.

17. A mechanical seal assembly for inhibiting a fluid located in a relatively higher pressure region from flowing to a relatively lower pressure region, the seal assembly configured for association with a rotatable cylindrical shaft which incorporates a seal ring connected to the shaft for rotation with the shaft and having a radially extending annular sealing face, the seal assembly comprising:

(a) a stationary cylindrical outer casing having a radially extending circular end wall having a circular opening through its center through which the shaft extends, and an axially extending cylindrical skirt connected around the circumference of the end wall and which extends away from the end wall in the direction of the shaft seal ring, wherein a radially extending annular flange is connected around the periphery of the cylindrical skirt, the flange extending in the direction of the longitudinal axis of the shaft;

(b) a non-rotatable seal ring mounted in the outer casing and encircling the shaft for limited axial movement toward and away from the shaft seal ring, the non-rotatable seal ring having:
(i) a circular opening through its center through which the shaft extends;
(ii) on its end distal the outer casing end wall, a radially extending annular sealing face for mating with the opposing annular sealing face of the shaft seal ring; and
(iii) on its end proximal the outer casing end wall, a radially extending annular face with an annular recess in the annular face around the center opening, wherein the diameter of the center opening remains constant from a location at the annular sealing face to a location a first axial distance toward the annular recess, the diameter progressively increasing from the first axial location to a location at the annular recess;

(c) means mounted in the outer casing for urging the non-rotatable seal ring axially for mating engagement of its radially extending annular sealing face with the radially extending annular sealing face of the rotatable shaft seal ring, said urging means comprising:
(i) a cylindrical bellows comprising a fluorocarbon polymer encircling the shaft and aligned with its longitudinal axis coincident with the longitudinal axis of the shaft, the bellows comprising:

an annular collapsible outer wall with a first end of the outer wall proximal the non-rotatable seal ring and a second end of the outer wall distal the non-rotatable seal ring;

a first skirt comprising a fluorocarbon polymer integrally formed with and extending radially around the periphery of the first end of the collapsible outer wall in a direction toward the shaft centerline, wherein a flange extends around the inner circumference of the first skirt, in a direction away from the outer casing circular end wall;

a second skirt comprising a fluorocarbon polymer integrally formed with and extending radially away from the second end of the collapsible outer wall in a direction away from the shaft centerline, the second skirt having a radially extending annular front surface facing toward the non-rotatable seal ring and a radially extending annular rear surface facing away from the non-rotatable seal ring, an annular groove being around the outer periphery of the second skirt rear facing surface, wherein the first bellows skirt is bonded to the radially extending annular face of the non-rotatable seal ring with the first skirt flange located in and bonded to the non-rotatable seal ring annular recess; and (ii) an annular spring encircling the shaft and extending between the circular end wall of the outer casing and the first bellows skirt for biasing the non-rotatable seal ring axially for mating engagement of its radially extending annular sealing face with the radially extending annular sealing face of the rotatable shaft seal ring; and (d) a cylindrical inner casing encircling the shaft, the inner casing having an axially extending outer wall with a first end proximal the non-rotatable seal ring and a second end distal the non-rotatable seal ring wherein a flange which extends radially and toward the shaft centerline is on the distal end of the axially extending outer wall, a plurality of lanced tabs are in the cylindrical surface of the axially extending outer wall, the tabs mating with a plurality of axially extending grooves in the outer perimeter of the non-rotatable seal ring to thereby hold the non-rotatable seal ring from rotational movement within the outer casing;

the second bellows skirt being clamped axially in the outer casing between the inner casing flange and the outer casing end wall wherein an annular elastomeric ring is mounted in the groove in said second bellows skirt and extends between the bellows skirt and the outer casing end wall.

18. A mechanical seal assembly as is claimed in claim 17, wherein the bellows outer wall in cross-section, is in wave form.

19. A mechanical Seal assembly as is claimed in claim 17, wherein the bellows exerts no axial force on the seal ring when the seal ring is at a mean deflection position.

20. A mechanical seal assembly as is claimed in claim 17, wherein the bellows outer wall comprises first and second annular segments joined together along a common edge, the outer edge of the first annular segment being the periphery of the first end of the bellows outer wall which is connected to the first skirt, and the outer edge of the second annular segment being the periphery of the second end of the bellows outer wall which is connected to the second skirt.

21. A mechanical seal assembly as is claimed in claim 20, wherein the common edge junction of the first and second annular segments defines a groove around the inside surface of the bellows.

22. The mechanical seal assembly as is claimed in claim 17, wherein the outer casing end wall has an annular groove in its surface in which the annular spring rides.

23. The mechanical seal assembly as is claimed in claim 17, wherein the outer casing comprises a plurality of holes for escape of fluids which seep between the sealing faces and into the assembly.

* * * * *